July 31, 1928.

C. WILLIAMS 1,679,195

AUTOMOBILE SIDE BUMPER

Filed Aug. 30, 1926

INVENTOR
CARL WILLIAMS
BY
ATTORNEY

Patented July 31, 1928.

UNITED STATES PATENT OFFICE.

CARL WILLIAMS, OF SAN FRANCISCO, CALIFORNIA.

AUTOMOBILE SIDE BUMPER.

Application filed August 30, 1926. Serial No. 132,347.

This invention resides in the provision of means for guarding the sides of automobiles against breakage and damage, which means is in the nature of a combined running-board and guard of a simple, inexpensive, light, strong and compact construction and is capable of being readily incorporated with the present day type of automobile without necessitating the making of material changes in the construction of the automobile.

One of the purposes of the invention is to provide a guard means of the character described in which the running-boards are yieldingly supported on the sides of the automobile and are constructed to serve as bumpers to prevent damage to the sides of the automobile and to the running board itself.

A further purpose of the invention is to provide a combined bumper and running-board of the character described in the form of a single unit and in which the means for attaching the running-board to the automobile is resilient and capable of yielding, it being in other words a resilient bracket and support so that when the running-board is struck in a collision or in any other manner, it will be permitted to yield sufficiently to prevent breaking thereof or any damage thereto or to the automobile.

A further object of the invention is to provide for the incorporation with the collision proof running-board such as above described, of front and rear mud guard protectors, which are adapted for attachment to the running-board and to the automobile in such manner as to prevent damage to the sides of the running-board, said guards being in the form of resilient bars which preferably follow the outline of the fenders.

With the above mentioned and other objects in view, the invention consists in the novel construction and combination of parts hereinafter described, illustrated in the accompanying drawing, and set forth in the claims hereto appended, it being understood that various changes in the form, proportion, size and minor details of construction within the scope of the claims may be resorted to without departing from the spirit or sacrificing any of the advantages of the invention.

Referring to the drawing.

Figure 1:
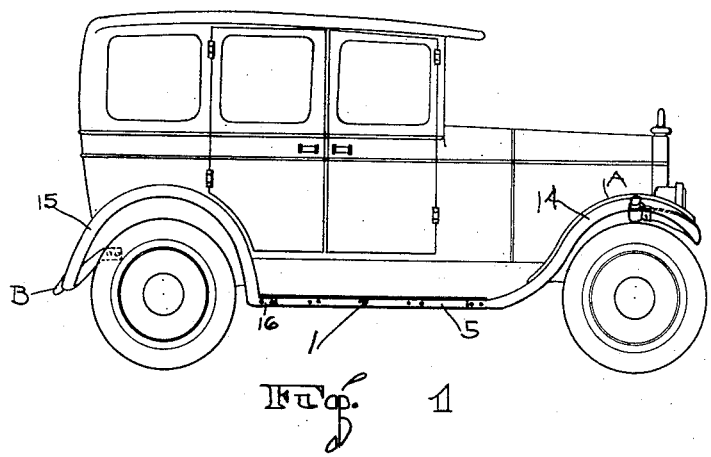
Fig. 1 represents a side elevation of an automobile showing the guard means of my invention applied thereto.
Figure 2:
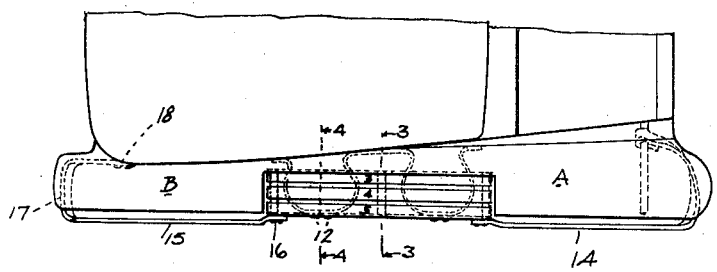
Fig. 2 is a fragmentary top plan view of an automobile showing the device of my invention as when applied to the running-board and fenders.
Figure 3:
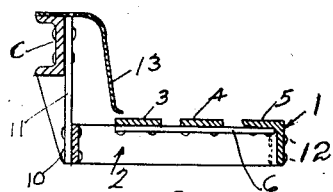
Fig. 3 is a sectional view taken on the plane of line 3—3 of Fig. 2.
Figure 4:
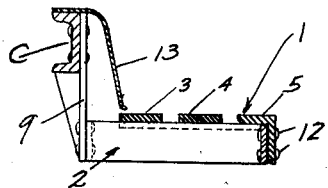
Fig. 4 is a sectional view taken on the plane of line 4—4 of Fig. 2.
Figure 5:
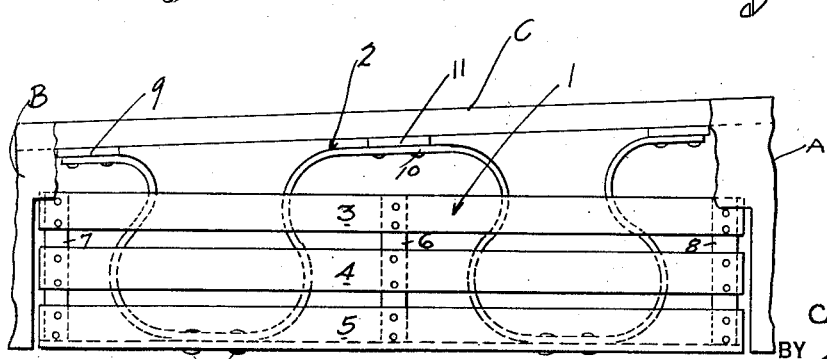
Fig. 5 is an enlarged fragmentary plan view of the running-board bumper of my invention with the fender guards removed.

In carrying out my invention I substitute for the ordinary running-board now commonly used on automobiles, a running-board, generally designated 1, preferably of skeleton form and which is preferably free from connection with the front and rear fenders, which latter are designated A and B respectively. This running-board is attached to the chassis designated C, by means of a spring bracket generally designated 2, there being no other means of connection required between the running-board and the vehicle. This spring bracket not only properly supports the running-board for its ordinary running-board uses but permits the running-board to yield inwardly and to some extent upwardly or downwardly when struck or brought into contact with another automobile or object, thereby preventing damage to the automobile and to the running-board as well.

The running-board may be constructed in any suitable manner provided it is of substantially the same size as the ordinary running-board. One way of constructing the running-board consists in employing a plurality of metal strips or bars, there being in the present instance three, which are designated 3, 4 and 5, which bars are arranged in spaced parallel relation and joined centrally of their ends and at their ends by metal cross bars 6, 7 and 8. The outer bar 5 is preferably of angle-iron form whereas the other bars are flat and the cross bars 6, 7 and 8 are preferably disposed beneath the bars 3, 4 and 5, rivets or any other suitable fastening means being employed to connect said bars.

The spring attaching and supporting bracket 2, in the present instance, is made of a single resilient strip or flat bar with its ends secured to attaching plates or brackets 9 which are suitably fastened to and depend from the chassis C. Approximately centrally of its ends this spring bar is fastened as at 10 to an attaching plate or bracket 11 corresponding to the one 9, thus providing three points of attachment of the spring bracket or chassis. Between these points of attachment the spring bracket is curved outwardly to form two loop portions which are attached by rivets or other fastenings 12 to the angle bar 5. Various forms of spring brackets may be used as desired, provided that said brackets serve to yieldingly attach the running-board 1 and support the same upon the sides of the automobile.

The bars 3 and 4 and a part of the bar 5 rest upon and are supported by the upper edge of the spring bracket in such manner that the bars 3 and 4 are permitted to slide inwardly relative to and on said spring, incident to the running-board being pushed inwardly when accidentally struck. The inner bar 3, that is to say the inner longitudinal edge of the running-board, is spaced outwardly from the side of the automobile sufficiently to permit of considerable inward movement of the running-board before contact thereof with the side of the automobile although actual contact with the chassis will not take place unless the board is struck with great force. To conceal the attaching plates 9 and 10 an apron 13 is fastened to the body of the chassis C, and hangs in front of said plates with its lower edge clear of the upper side of the running-board but close thereto. The ends of the fenders A and B instead of being attached to the running-boards are disposed in upwardly spaced relation and close to the upper sides of the running-boards. By this arrangement it will be seen that the running-boards will yield when struck directly head-on, or at an angle, sufficiently to cushion the impact and avoid breakage or damage thereof.

With the yielding running-board of this invention provision is made for use of extensions of the running-board to protect the fenders or mud guards. This may be carried out by providing resilient metal bars 14 and 15 for the front and rear fenders respectively, which bars are disposed in outwardly spaced relation to the outer edges of the mud guards and are curved to follow the outline of the guards, their terminals being connected to the ends of the running-boards and to suitable parts of the automobile respectively. In the present instance, certain terminals of these bars are offset as at 16 and suitably fastened to the outer sides of the angle bars 5 at the ends thereof. The other terminals are bent first inwardly as at 17, then upwardly so as to extend back towards the running-boards, whereby they may be fastened as shown at 18 to the sides of the body or to the chassis or other convenient parts of the automobile. This provides resilient bumpers along the sides of the mud guards so that said mud guards will be protected against breakage or damage. The ordinary bumpers, not shown, for the front and rear of the automobile provide adequate protection for the ends of the mud guards and with the side bumpers of this invention, complete protection of the mud guards or fenders is provided.

While I have shown the bars 14 and 15 as separate pieces, they may be made as a continuation of the angle bar 5 of the running-board, it being thought unnecessary to illustrate this obvious modification. It may also be possible to eliminate the fastening of the outer ends of these fender guards and I do not wish to be limited to the exact form of guard shown inasmuch as I consider it to be within the scope of my invention to provide as a unit, a running-board mounted to yield inwardly horizontally, and to some extent both upwardly and downwardly, which running-board may be provided with extensions to protect the fenders or mud guards of the front and rear wheels.

I claim:

1. The combination with an automobile, of running-boards extending along the sides of the automobile and substantially horizontally disposed resilient brackets constituting the sole means of connecting the running-boards with and supporting the same on the sides of the automobile, and which bracket yields laterally incident to encounter of the running-board with an obstruction.

2. An automobile including a running-board extending along the sides thereof and resilient brackets constituting the sole means for attaching the running-boards to and supporting them on the sides of the automobile in such manner that such running-boards will yield laterally incident to accidental encounter with an obstruction.

CARL WILLIAMS.